(12) United States Patent
Abrahamsson

(10) Patent No.: US 7,098,843 B2
(45) Date of Patent: Aug. 29, 2006

(54) AUTOMATIC SENSITIVITY CONTROL FOR RADAR LEVEL GAUGES

(75) Inventor: Par Abrahamsson, Linkoping (SE)

(73) Assignee: SAAB Rosemount Tank Radar AB, Gothenburg (SE)

( * ) Notice: Subject to any disclaimer, the term of this patent is extended or adjusted under 35 U.S.C. 154(b) by 78 days.

(21) Appl. No.: 10/855,770

(22) Filed: May 27, 2004

(65) Prior Publication Data
US 2005/0264441 A1   Dec. 1, 2005

(51) Int. Cl.
*G01S 13/08* (2006.01)
(52) U.S. Cl. .......................... 342/124; 342/85; 342/92
(58) Field of Classification Search ............ 342/82–88, 342/91–93, 123, 124
See application file for complete search history.

(56) References Cited

U.S. PATENT DOCUMENTS

| | | | |
|---|---|---|---|
| 5,440,310 A * | 8/1995 | Schreiner .................... | 342/124 |
| 5,822,275 A | 10/1998 | Michalski .................... | 367/99 |
| 6,031,421 A | 2/2000 | McEwan ..................... | 330/10 |
| 6,107,957 A * | 8/2000 | Cramer et al. .............. | 342/124 |
| 6,867,729 B1 * | 3/2005 | Berry et al. ................. | 342/124 |
| 6,987,481 B1 * | 1/2006 | Fehrenbach et al. ........ | 342/124 |
| 6,995,706 B1 * | 2/2006 | Ohlsson ...................... | 342/124 |
| 7,046,189 B1 * | 5/2006 | Spanke et al. .............. | 342/124 |
| 2001/0050629 A1 | 12/2001 | Benway et al. ............. | 342/124 |
| 2005/0264441 A1 * | 12/2005 | Abrahamsson ............. | 342/124 |
| 2006/0012512 A1 * | 1/2006 | Jirskog ....................... | 342/124 |

FOREIGN PATENT DOCUMENTS

EP   0 570 140 B1   1/1998

OTHER PUBLICATIONS

"Close range radar sensor for measurement of sugar-cane level inside a chute", Woods, G.S.; Maskell, D.L.; Jurd, B. Microwave Conference, 2000 Asia-Pacific 2000 pp. 108-111.*
"A laser for the measurement of liquid level heights", Kostamovaara-J; Maatta-K; Myllyla-R. International Conference on Optoelectronic Science and Engineering '90, Beijing, China, Aug. 22-25, 1990, vol. 1230, p. 297-300.*

* cited by examiner

*Primary Examiner*—John B. Sotomayor
(74) *Attorney, Agent, or Firm*—Westman, Champlin & Kelly, P.A.

(57) ABSTRACT

A radar level gauge system for determining the filling level of a filling material in a tank is disclosed. The system comprises an antenna device for emitting measuring signals towards the surface of the filling material and a receiver device for receiving echo signals from the tank. Further, the system comprises processing circuitry for determining the filling level of the tank based on said echo signal, wherein said processing circuitry is adapted to amplify the received echo signals in dependence of the distance from which the echo signals originates, in such a way that an echo signal from a lower filling level is more amplified than an echo signal from a higher filling level. The processing circuitry is adjustable to optimize the amplification of the echo signal based on the height of the tank.

A corresponding processing circuitry and method of operation is also disclosed.

21 Claims, 2 Drawing Sheets

AUTOMATIC SENSITIVITY CONTROL FOR RADAR LEVEL GAUGES

FIELD OF THE INVENTION

The present invention relates to a radar level gauge system for determining the filling level of a filling material in a tank, comprising an antenna device for emitting measuring signals towards the surface of the filling material; a receiver device for receiving echo signals from the tank; and processing circuitry for determining the filling level of the tank based on said echo signal, wherein said processing circuitry is adapted to amplify the received echo signals in dependence of the distance from which the echo signals originates, in such a way that an echo signal from a lower filling level is more amplified than an echo signal from a higher filling level. Further, the invention also relates to a corresponding processing circuitry, and a method for determining the filling level of a filling material in a tank.

BACKGROUND OF THE INVENTION

Radar level gauges are in wide use for making non-contact measurements of the level of products such as process fluids, granular compounds and other materials. These devices utilize antennas to transmit electromagnetic waves toward the material being monitored and to receive electromagnetic echoes which are reflected at the surface of the material being monitored. However, in a practical situation more than one radar echo usually can be seen and the dynamic range for the variation of all possible echoes is quite large.

However, a problem experienced in this type of level gauges is that the signal strength from a surface echo reduces as a function of measured distance. Typically, the signal strength reduces by 50% if the distance is doubled. As a consequence, the dynamic range in the receiver part is not optimally used. One method known in the art to compensate for this loss of signal strength is to amplify the received signal with a magnitude which is increased as a function of distance, so called IF-gain. Further, many radar level gauge systems have to work under low current and voltages and should preferably use low cost components. Thus, many of the classical methods for increased dynamic range may not be employable.

In order to solve the above-related problem, it has been proposed to increase the signal strength of the received signals in dependence of the distance from which the echoes originates. For example, U.S. Pat. No. 6,031,421 discloses a pulsed system for radar level gauging using sensitivity time control (STC), where the amplification in the receiver is controlled to provide a exponential gain with increased distance. U.S. Pat. No. 6,107,957 discloses a FMWC (frequency modulated continuous wave) radar level gauge using a similar amplification gain-control in order to provide an amplification inversely proportional to the distance from which the echoes originate.

However, a problem with these known systems is that they are relatively insensitive and static, and unable to adapt to the specific conditions related to the tank in which they are to be used, Specifically, the known systems are conventionally dimensioned for a maximal measuring distance, e.g. 30 meters. However, in practical use the tanks are of varying height, whereby non-optimal amplification is provided.

Still further, most known systems have problems related to the noise level, due to the increased noise level generated by the amplification. This is particularly disadvantageous in measuring systems subjected to high noise levels.

It is therefore a need for a more effective amplification control for use in level gauging.

SUMMARY OF THE INVENTION

It is therefore an object of the present invention to provide a radar level gauge system, a processing circuitry for use in such a radar level gauge system and a method of determining the filling level of a filling material, which at least partly alleviate the above-discussed problems of the prior art.

This object is achieved with a radar level gauge system, a processing circuitry and a method according to the appended claims.

According to a first aspect of the invention, there is provided a radar level gauge system for determining the filling level of a filling material in a tank having a tank height, wherein the filling level is less or equal to said tank height, comprising: a transmitter for transmitting measuring signals towards the surface of the filling material; a receiver for receiving echo signals from the tank.; and processing circuitry for determining the filling level of the tank based on said echo signal, wherein said processing circuitry is adapted to amplify the received echo signals according to an amplification scheme in dependence of the distance from which the echo signals originates, in such a way that an echo signal from a lower filling level is more amplified than an echo signal from a higher filling level. The amplification scheme of the processing circuitry is further adjustable, and the processing circuitry comprises direct or indirect information on the tank height, and is adapted to adjust said amplification scheme in order to optimize the amplification of the echo signal based on the height of the tank.

With this radar level gauge system, an automatic sensitivity control is provided. Thus, the per se known functionality of amplifying the received echo signals could now be used in a much more efficient and reliable manner, since the amplification is optimized for the actual working conditions at hand, and for the actual tank in which the system is installed. The amplification could then in a more optimized way than is heretofore known, be used, e.g. by voltage control, to provide higher amplification for echoes from larger distances, Thereby, the sensitivity of the system, and consequently also the accuracy of the measurements, is maximized by adjusting the gain based on configured tank height. The amplification increase could be fixed or be controlled based on the strength of the echoes present. Theoretically, an increase of up to 12 dB is obtainable, which would render a four times as long measuring distance possible, or a doubling of the measuring distance with half as large an antenna. This has also been confirmed in practice.

By using the present invention, echoes from a far distance have the same possibility to be recognized as nearby echoes, i.e. the amplification provides the same echo signal strength regardless of the distance, and the response could be optimized for the tank height where the system is actually used. Hereby, the dynamic range of the amplification means is more effectively used, compared to known systems where the amplification is normally dimensioned for a maximal measuring distance, e.g. 30 meters, which provides a non-optimal use of the dynamic range of the amplifier when used in tanks of other heights. Since the dynamic range of the amplification means is normally limited, it is of great importance to make as effective use of said range as possible over the measuring distance in actual use. The present invention is particularly advantageous for large measuring distances.

The adjustment of the amplification scheme in order to optimize the amplification of the echo signal based on the height of the tank should be understood as an improvement of the amplification scheme compared to a non-adjusted scheme, and preferably an improvement to the highest practically feasible level. However, the highest feasible level may possibly not be the same as the highest theoretically feasible level, but may incorporate safety margins etc.

The radar level gauge system could be a continuous system, such as a FMWC system, in which the antenna device is adapted to emit continuous signals, and wherein the processing circuitry is adapted to determine the filling level based on a phase difference between the received echo signal and a reference signal. In an FMWC system, the emission is normally continuous, but with a frequency sweep. A filter arrangement, as is e.g. disclosed in U.S. Pat. No. 6,107,957, could be used for providing a greater amplification for higher frequencies compared to lower frequencies. In FMWC systems the adjustability to optimize the amplification of the echo signal based on the height of the tank could be implemented by using different, replaceable filters, or filters with controllable filter output, for processing of the signals before amplification.

However, the invention could equally well be used in a pulsed system for level gauging, e.g. a STC system, in which the antenna device is adapted to emit pulsed signals, and wherein the processing circuitry is adapted to determine the filling level based on the time between the emission of a pulsed signal and the reception of the echo of said signal. In fact, the invention is particularly usefull in this type of systems, since the above-discussed problems have previously been particularly difficult to handle in this type of system. In such a pulsed system the amplification in the receiver could be controlled to provide a exponential gain with increased distance based on the tine it takes for the echo to come back for an emitted pulse, as is disclosed e.g in U.S. Pat. No. 6,031,421. In pulsed systems, a control software could be used that provides a controllable voltage ramp for the amplification, as is discussed more thoroughly in the following.

Accordingly, the present invention could be used in essentially any type of freely emitting level gauge system.

Preferably, the processing circuitry is arranged to amplify the echo signal before any other significant processing or manipulation of the signal. Thus, the amplifier is situated relatively close to the microwave modulation (MW) module. Hereby, the noise level could be significantly reduced.

The amplification scheme of the processing circuitry is preferably adjustable to optimize the amplification of the echo signal based on the height of the tank by means of software control, based on an input tank height value. The software could e.g. be an embedded control software, executed on an conventional signal processor as is per se known in the art By using such software control, the adjustability for different tank heights etc becomes relatively simple and cost effective, making the process of installing the radar level gauge system, and adapting the system for the working conditions at hand, relatively simple.

Alternatively, the amplification scheme of the processing circuitry could be adjustable to optimize the amplification of the echo signal based on the height of the tank by means of a hardware control unit, said hardware control unit being chosen based on an estimated tank height.

The processing circuitry preferably comprises a controllable amplification means for amplification of a received echo signal according to the amplification scheme, wherein said amplification scheme comprises an amplification ramp for amplification in dependence of the distance from which the echo signals originates, and further the processing circuitry comprises a control unit for optimizing the amplification ramp based on an estimation of the height of the tank. The ramp is preferably voltage controlled as a function of the measuring distance. The range of the ramp is controlled, preferably by a controlling software, so that it corresponds to the tank height The control unit is preferably adapted to optimize the amplification ramp so that essentially the whole dynamic range of the controllable amplification means is useable for received echo signals originating from a distance range corresponding to the estimated height of the tank.

The amplification scheme of the processing circuitry is preferably adapted to control the amplification in order to provide the maximum amplification for echo signals originating from a level corresponding to the tank bottom at the actual tank. Hereby, the system could be controlled to use the full dynamic range of the amplification means in each and every tank where the system is used, regardless of e.g. varying tank heights.

Further, the processing circuitry is preferably adapted to estimate information on the tank height automatically, based on at least one previously determined filling level. Hereby, the system adapts itself automatically to new conditions, whereby the installation process becomes easier and less costly. For example, a first filling level measurement could be based on a standard value, and thereafter, better estimates of the filling level could be acquired during use, based on subsequent filling level determinations. The tank height could normally be estimated to be the lowest estimated filling level, but possibly with some adjustments related to the number of filling level determinations that have been made since installation of the system or the latest reset of the system, etc.

According to a second aspect of the invention, there is provided a processing circuitry for use in a radar level gauge system for determining the filling level of a filling material in a tank having a tank height, wherein the filling level is less or equal to said tank height, comprising: controllable amplification means for amplification of a received echo signal according to an amplification ramp in dependence of the distance from which the echo signals originates; and a control unit for optimizing the amplification ramp based on an estimated tank height of a tank in which the processing circuitry is to be used.

This processing circuitry could be used in the previously discussed radar level gauge system, and provides the same or similar advantages.

According to a third aspect of the invention, there is provided a method of determining the filling level of a filling material in a tank having a tank height, wherein the filling level is less or equal to said tank height, comprising:

transmitting measuring signals towards the surface of the filling material;

receiving echo signals from the tank;

providing an amplification scheme for amplification of the received echo signals in dependence of the distance from which the echo signals originates, in such a way that an echo signal from a lower filling level is more amplified than an echo signal from a higher filling level;

providing direct or indirect information on the tank height;

optimizing said amplification scheme based on said height of the tank;

using said optimized amplification scheme for amplification of the received echo signals; and calculating the filling level of the tank based on said received echo signals.

This method could be used for operating the previously discussed radar level gauge system, and provides the same or similar advantages.

These and other aspects of the invention will be apparent from and elicited with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DESCRIPTION OF PREFERRED EMBODIMENTS

Figure 1:
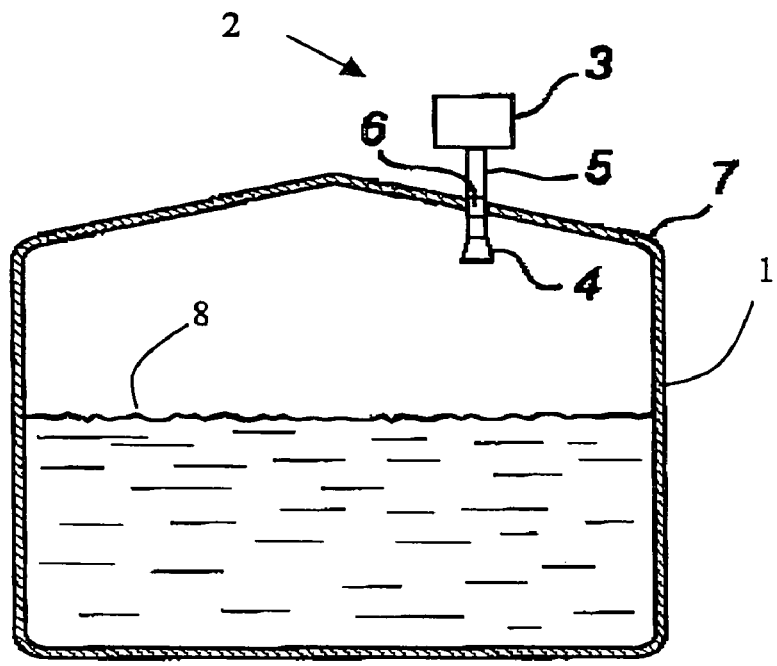
FIG. 1 is a schematic cross-sectional side view of a container, in which an antenna device according to the embodiment is arranged.

FIG. 1 shows schematically a tank 1 provided with a radar level gauge system 2. In brief, the system in FIG. 1 comprises an electronic unit 3 for transmitting and receiving radar signals and processing the received signals in order to determine the level in the tank, an antenna 4 arranged inside the tank for transmitting and receiving radar waves into the tank, and a radar wave guide assembly 5 for guiding signals between the electronic unit 3 and the antenna 4. In order to maintain temperature and pressure in the tank, and to protect the outside environment from the tank contents, a wave guide sealing 6 is arranged close to where the wave guide 5 passes through the tank wall 7 to provide sealing of the tank 1. The same antenna could preferably be used both as a transmitter for emitting the output radiation and as a receiver for receiving the reflected echo signal.

In use, the radar level gauge 2 transmits radar energy along the waveguide, 5 through the tank roof port and receives reflected energy from the liquid surface 8 to provide an indication of the level of the liquid within the tank. The radar level gauge 2 could be coupled to a remote location (for example a control room) via a signal wire or the like.

The system may use pulsed or continuously emitted radiation. For systems using pulsed radiation the transit time for the pulsed signals before returning as echo signals are used for measuring the level in the container or tank. Such a pulsed system is e.g. disclosed in U.S. Pat. No. 5,822,275, hereby incorporated by reference. A transmission phase and a receiving phase form together a measurement cycle.

Figure 2:
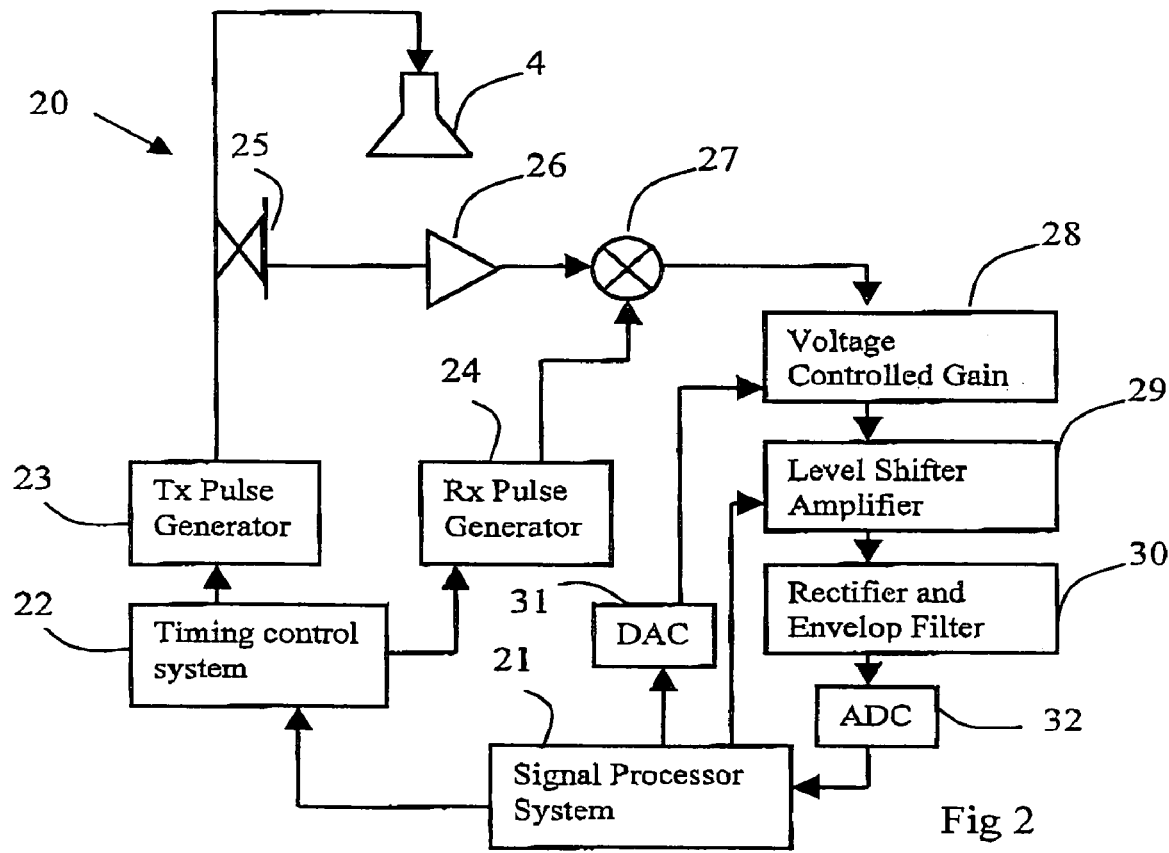
FIG. 2 is a schematic block diagram illustrating a radar level gauging system according to an embodiment according to the invention.
Figure 3:
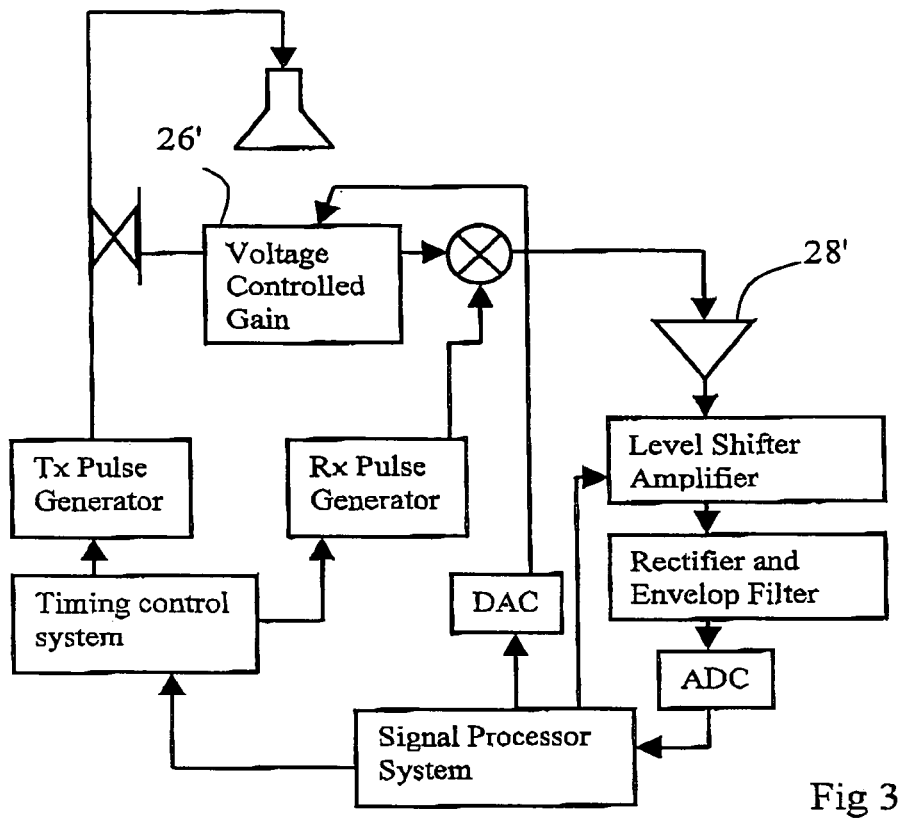
FIG. 3 is a schematic block diagram illustrating a radar level gauging system according to a second embodiment according to the invention.

A processing circuitry 20 to be used in a radar level gauge system as discussed generally above is schematically illustrated in FIGS. 2 and 3.

In the embodiment shown in FIG. 2, circuitry 20 includes a signal processor 21, a timing control system 22, a Tx pulse generator 23 and a Rx pulse generator 24. The signal processor 21 controls the timing control system, which in turns controls the Tx and Rx pulse generators. The Tx pulse generator 23 generates pulsed radiation for emission into the tank, whereas the Rx pulse generator 24 generates a reference pulse to be used for calculation of the time difference between the pulses, subsequently to be used in the estimate of the filling level of the tank. The reflected Tx pulse, in this application generally referred to as the echo signal, is received by the antenna 4, and through a directional coupler 25 forwarded to an amplifier 26. In the mixer 27, the amplified echo signal and the Rx signal from the Rx pulse generator 24 are mixed, in order to generate an output signal indicative on the time difference between the pulses.

The signal processor 21 is preferably a digital signal processor adapted for implementing the various algorithms and functions of the present invention, as discussed more thoroughly in the following. In case the signal processor is digital, a DAC 31 could be provided to convert outgoing digital signals to analog, and a ADC 32 could be provided to convert incoming analog signals to digital.

The mixed signal is provided to a voltage controlled gain amplifier 28, a level shifter amplifier 29 and a rectifier and envelop filter 30, for signal processing, as is per se known from the art.

In addition, the controlled gain amplifier 28 provides automatic gain control to compensate for the decreased signal strength of echo signals originating from lower levels in the tank, i.e. signals having traveled farther.

The signal processor 21 is preferably a microprocessor based circuit adapted to receive the incoming signal, as discussed above, and provide as an output a signal or information indicative of the level of material 8. The functions and algorithms implemented by signal processor 110, some of which can be embodied in hardware and some of which can be embodied in software, are per se known from the art will not be discussed further in this application.

The amplification of the received signal is further controlled so that the distance variable amplification is chosen to be set at its maximum value at the level corresponding to the tank bottom at the actual tank. Hereby, the sensitivity is maximized by adjusting the gain based on configured tank height, which provides a very efficient use of the dynamic range of the amplification means.

The control of the amplification means to this end could be accomplished by introduction of adequate hardware components to the system, such as filters etc, or by controllable hardware components that are manually adapted to the specifics of the tanks in which the system is to be used.

However, it is also possible to use software control of the amplification means, the software control preferably provided by the signal processor, and preferably by means of embedded control software in the signal processor 21.

Figure 4:
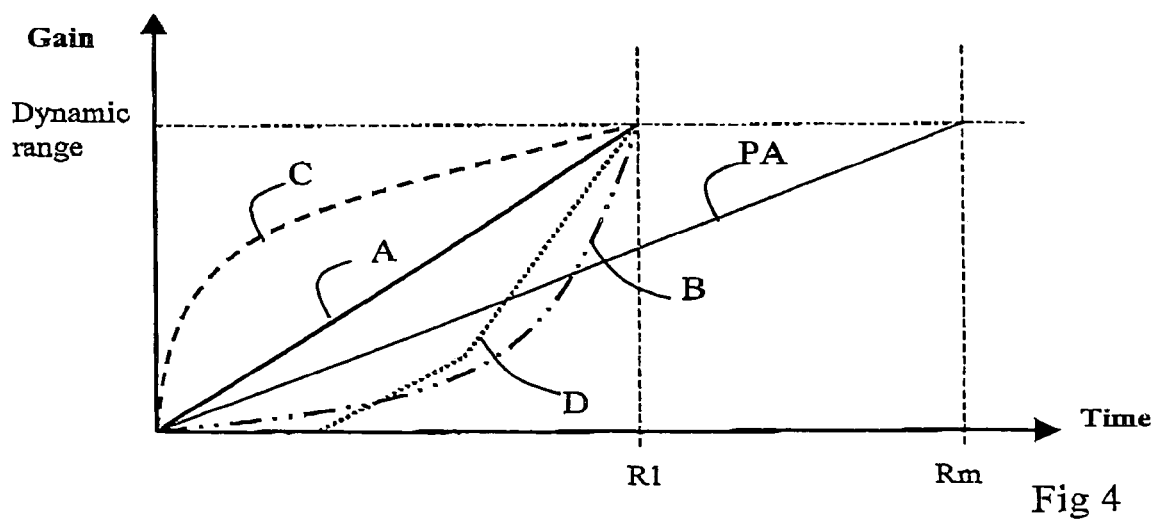
FIG. 4 is a schematic diagram illustrating the amplification gain as a function of time (corresponding to distance) according to an embodiment of the invention

Preferably, the signal processor provides an amplification ramp for the amplification means 28, providing an voltage controlled increased amplification over the measuring cycle. However, this amplification ramp is then linearly distributed over the entire available measuring distance Rm of the system, e.g. 30 meters. Such an amplification ramp PA is illustrated in the diagram in FIG. 4. However, the tank height is normally only a part of the maximally available measuring range Rm. Accordingly, the actually used measuring range R1 is therefore set at a value corresponding to the estimated or measured tank height, and thereafter the amplification ramp is optimized based on said actually used measuring range R1. Such an amplification ramp is illustrated as ramp A in FIG. 4. The amplification ramp could be a linear amplification ramp from the starting point and the end of the actual range R1, as is the case in ramp A. However, depending on the measuring conditions at hand, such as the geometry of the tank, the radar level gauge system used, the filling material to be measured, etc, the ramp could be optimized in various ways. For example, it could sometimes be advantageous to use non-linear ramps, such as an exponential or inversely exponential ramp, in FIG. 4 schematically illustrated as ramps B and C, respectively. Further, it may be advantageous to use ramps comprising two or more separate parts, or ramps starting at a delayed starting point. This is schematically illustrated by ramp D in FIG. 4.

In addition, or as an alternative, the amplification of the amplification means 28 may also be controlled using the measuring signals received from the antenna 4 as input.

With the above-described amplification scheme, the amplification provides the same echo signal strength regardless of the distance, and the dynamic range of the amplification units are optimally used.

In the system illustrated in FIG. 2, the second amplification means 28 is actively controlled in the way discussed above. Thus, in this embodiment, the controllable amplification is provided immediately after the mixer 27. Having the controllable amplification at such an early stage of the signal processing is advantageous, since the noise problem is thereby alleviated.

However, it is also possible to provide the controllable amplification unit before the mixer 27. Such an embodiment is illustrated in FIG. 3, in which the amplifier 26' is controllable in the way discussed thoroughly in the foregoing In this embodiment, the amplification unit 28' need not be controllable. In this embodiment, the noise levels could be even further reduced, alleviating the noise problems even further.

Even though a pulsed radar level gauge system has been disclosed, the invention could equally well be used in a continuous system, e.g. a FMWC system. Such a system is e.g. disclosed in U.S. Pat. No. 6,107,957, which is hereby incorporated by reference.

In such systems, a first or reference signal having a varying frequency is generated and the transmitted electromagnetic waves are produced as a function of the frequency of the reference signal. A second signal is then obtained from the electromagnetic waves reflected by the surface of the material and received by the antenna. The two signals should have substantially the same frequency, bat different phases. A phase shift signal is then generated as a function of the phase differences between the reference signal and the second signal over the range of frequencies. The frequency of the phase shift signal is indicative of the distance traveled by the electromagnetic waves between the antenna and the surface of the material being monitored, and thereby of the level of the material.

Accordingly, in a continuous system the mixer 27 provides an output phase shift signal, having a frequency which is dependent upon the phase difference between continuous signals Tx' and Rx', and which is thereby indicative of the distance traveled by the electromagnetic waves and thus of the level of material 8. Further, the voltage controlled gain amplifier 28 in this case applies a frequency dependent gain to the incoming phase shift signal and provides the amplified phase shift signal at the output. Thus, higher frequency phase shift signals, which have lower amplitudes as a result of the amplitude loss of the electromagnetic waves as they travel further to and from material 8, are amplified more than are lower frequency signals.

In a continuous system, the amplification would not be a function of time, but a function of the frequency of the phase shift signal over a desired frequency range. However, the amplification range could still be optimized for the tank height in essentially the same way as discussed in the foregoing for the pulsed system.

With the present invention, the limited dynamics of the amplification units are used as effectively as possible over the entire measuring distance in actual use. This has proven remarkably efficient, and is specifically advantageous for large measuring distances.

Specific embodiments of the invention have now been described. However, several alternatives are possible, as would be apparent for someone skilled in the art. For example, many different components may be used for performing the various functions of the level gauge system and the processing circuitry, as would be readily apparent for someone skilled in the art. Further, the proposed amplification control may be used in different types of level gauge systems, and in particular for both continuous and pulsed systems. Such and other obvious modifications must be considered to be within the scope of the present invention, as it is defined by the appended claims.

What is claimed is:

1. A radar level gauge system for determining the filling level of a filling material in a tank having a tank height, wherein the filling level is less or equal to said tank height, comprising:
    an transmitter for transmitting measuring signals towards the surface of the filling material;
    a receiver for receiving echo signals from the tank; and
    processing circuitry for determining the filling level of the tank based on said echo signal, wherein said processing circuitry is adapted to amplify the received echo signals according to an amplification scheme in dependence of the distance from which the echo signals originates, in such a way that an echo signal from a lower filling level is more amplified than an echo signal from a higher filling level;
    wherein the amplification scheme of the processing circuitry is adjustable, and wherein the processing circuitry comprises direct or indirect information on the tank height, and is adapted to adjust said amplification scheme in order to optimize the amplification of the echo signal based on the height of the tank.

2. The gauge system of claim 1, wherein the antenna device is adapted to emit continuous signals, and wherein the processing circuitry is adapted to determine the filling level based on a phase difference between the received echo signal and a reference signal.

3. The gauge system of claim 1, wherein the antenna device is adapted to emit pulsed signals, and wherein the processing circuitry is adapted to determine the filling level based on the time between the emission of a pulsed signal and the reception of the echo of said signal.

4. The gauge system of claim 1, wherein the processing circuitry is arranged to amplify the echo signal before any other significant processing or manipulation of the signal.

5. The gauge system of claim 1, wherein the amplification scheme of the processing circuitry is adjustable to optimize the amplification of the echo signal based on the height of the tank by means of software control, based on an input tank height value.

6. The gauge system of claim 1, wherein the amplification scheme of the processing circuitry is adjustable to optimize the amplification of the echo signal based on the height of the tank by means of a hardware control unit, said hardware control unit being chosen based on an estimated tank height.

7. The gauge system of claim 1, wherein the processing circuitry comprises a controllable amplification means for amplification of a received echo signal according to the amplification scheme, said amplification scheme being an amplification ramp for amplification in dependence of the distance from which the echo signals originates, and a control unit for optimizing the amplification ramp based on an estimation of the height of the tank.

8. The gauge system of claim 7, wherein the amplification of the amplification means is voltage controlled.

9. The gauge system of claim 7, wherein the control unit is adapted to optimize the amplification ramp so that essentially a whole dynamic range of the controllable amplification means is useable for received echo signals originating from a distance range corresponding to the estimated height of the tank.

10. The gauge system of claim 1, wherein the amplification scheme of the processing circuitry is adapted to control the amplification in order to provide the maximum amplification for echo signals originating from a level corresponding to the tank bottom at the actual tank.

11. The gauge system of claim 1, wherein the processing circuitry is adapted to estimate information on the tank height automatically, based on at least one previously determined filling level.

12. A processing circuitry for use in a radar level gauge system for determining the filling level of a filling material in a tank having a tank height, wherein the filling level is less or equal to said tank height, comprising:
controllable amplification means for amplification of a received echo signal according to an amplification ramp in dependence of the distance from which the echo signals originates; and
a control unit for optimizing the amplification ramp based on an estimated tank height of a tank in which the processing circuitry is to be used.

13. A method of determining the filling level of a filling material in a tank having a tank height, wherein the filling level is less or equal to said tank height, comprising:
transmitting measuring signals towards the surface of the filling material;
receiving echo signals from the tank;
providing an amplification scheme for amplification of the received echo signals in dependence of the distance from which the echo signals originates, in such a way that an echo signal from a lower filling level is more amplified than an echo signal from a higher filling level;
providing direct or indirect information on the tank height;
optimizing said amplification scheme based on said height of the tank;
using said optimized amplification scheme for amplification of the received echo signals; and
calculating the filling level of the tank based on said received echo signals.

14. The method claim 13, wherein the measuring signals are transmitted continuously, wherein the filling level is determined based on a phase difference between the received echo signal and a reference signal.

15. The method of claim 13, wherein the measuring signals are transmitted pulsed, wherein the filling level is determined based on the time between the emission of a pulsed signal and the reception of the echo of said signal.

16. The method of claim 13, wherein the amplification of the echo signals is made before any other significant processing or manipulation of the signal.

17. The method of claim 13, wherein the amplification scheme is optimized for the height of the tank by means of software control, based on an input tank height value.

18. The method of claim 13, wherein the amplification scheme comprises an amplification ramp, the amplification ramp being optimized based on the height of the tank.

19. The method of claim 18, wherein the amplification ramp is optimized so that essentially a whole dynamic range of a controllable amplification means is useable for received echo signals originating from a distance range corresponding to the estimated height of the tank.

20. The method of claim 13, wherein the amplification scheme is optimized in order to provide the maximum amplification for echo signals originating from a level corresponding to the tank bottom at the actual tank.

21. The method of claim 13, wherein information on the tank height is provided by estimating the tank height based on at least one previously determined filling level.

* * * * *